(12) United States Patent
Gloeggler et al.

(10) Patent No.: US 8,834,171 B2
(45) Date of Patent: Sep. 16, 2014

(54) SIMULATION SYSTEM FOR TRAINING IN ENDOSCOPIC OPERATIONS

(75) Inventors: Bernhard Gloeggler, Tuttlingen (DE); Bjoern Speiser, Rottweil (DE); Thomas Hinding, Aldingen (DE)

(73) Assignee: Karl Storz GmbH & Co. KG (DE)

( * ) Notice: Subject to any disclaimer, the term of this patent is extended or adjusted under 35 U.S.C. 154(b) by 338 days.

(21) Appl. No.: 12/963,429

(22) Filed: Dec. 8, 2010

(65) Prior Publication Data

US 2011/0212426 A1    Sep. 1, 2011

(30) Foreign Application Priority Data

Dec. 23, 2009   (DE) .......................... 10 2009 060 522

(51) Int. Cl.
   *G09B 23/28*  (2006.01)
(52) U.S. Cl.
   CPC ................................... *G09B 23/285* (2013.01)
   USPC ........................................................ 434/262
(58) Field of Classification Search
   USPC .................. 434/262–275; 600/101, 117, 118; 348/45, 65–77
   See application file for complete search history.

(56) References Cited

U.S. PATENT DOCUMENTS

| | | | |
|---|---|---|---|
| 6,106,301 A * | 8/2000 | Merril ............................ | 434/262 |
| 6,267,599 B1 * | 7/2001 | Bailey ........................... | 434/262 |
| 7,806,696 B2 * | 10/2010 | Alexander et al. ............. | 434/267 |
| 7,967,830 B2 * | 6/2011 | Ayala et al. .................... | 606/108 |
| 8,107,086 B2 * | 1/2012 | Hart et al. ...................... | 356/601 |
| 2005/0196739 A1 | 9/2005 | Moriyama | |
| 2007/0134637 A1 | 6/2007 | Bronstein et al. | |
| 2010/0317923 A1 * | 12/2010 | Endo et al. .................... | 600/178 |

FOREIGN PATENT DOCUMENTS

| | | |
|---|---|---|
| DE | 102004046238 A1 | 3/2006 |
| WO | 02070980 A1 | 9/2002 |

OTHER PUBLICATIONS

U.S. Appl. No. 11/603,197, filed Nov. 2006, Bronstein et al.*
U.S. Appl. No. 12/736,536, filed Apr. 2009, Lacey et al.*
U.S. Appl. No. 12/969,891, filed Dec. 2010, Beck et al.*
U.S. Appl. No. 09/571,103, filed May 2000, Bailey.*
U.S. Appl. No. 11/252,363, filed Oct. 2005, Mangiardi et al.*

* cited by examiner

*Primary Examiner* — Sam Yao
*Assistant Examiner* — Michael Humphrey
(74) *Attorney, Agent, or Firm* — St. Onge Steward Johnston & Reens LLC

(57) ABSTRACT

A simulation system for training in endoscopic operations includes an endoscope apparatus, including at least one input for inserting an endoscopic working instrument, a sensor arrangement to detect a movement of the endoscopic working instrument, a control device to generate a virtual image of an endoscopic operation scene depending on a movement of the endoscopic working instrument, transmission means to transmit measured values supplied by the sensor arrangement to the control device for use in generating the virtual image and a display device to display the virtual image, where the sensor arrangement includes at least one optic sensor that interacts with a surface of a shaft of the endoscopic working instrument to detect the movement of the endoscopic working instrument. A flexible endoscope, an endoscopic working instrument and a method for recording a movement of an endoscopic working instrument as well as a method for training in endoscopic operations.

14 Claims, 5 Drawing Sheets

SIMULATION SYSTEM FOR TRAINING IN ENDOSCOPIC OPERATIONS

CROSS-REFERENCE TO RELATED APPLICATIONS

The present application claims priority of German patent application No. 10 2009 060 522.3 filed on Dec. 23, 2010.

FIELD OF THE INVENTION

The present invention relates to a simulation system for training in endoscopic operations, a flexible endoscope, an endoscopic working instrument, as well as a method for recording a movement of an endoscopic working instrument and a method for training in endoscopic operations.

BACKGROUND OF THE INVENTION

Apparatuses and methods of the aforementioned type are known in the art. For example, in application DE 10 2004 046 038 A1, a virtual operating room simulator is described that is intended in particular for training in endo-urological procedures. Contrary to surgical or endoscopic training models which make use of a realistic likeness of a body part or body cavity into which the tip of an endoscope is introduced to simulate a surgical or minimally invasive procedure, with a virtual simulator an image of a virtual environment, in particular of a body cavity, is generated with virtual reality methods and computer support and can be influenced interactively by the user. According to DE 10 2004 046 038 A1, the virtual operating room simulator includes a simulation computer unit to generate such a virtual endoscopic image in real time, an instrument whose proximal (that is, close to the user) part is a copy of the part of an endoscopically usable instrument, in particular a resectoscope, and an instrument insertion unit for inserting the instrument. In addition to displaying the virtual image, the force reaction onto the instrument or onto a distally positioned (that is, farther from the user) resection loop is computed and conveyed to the user. To record the movement of the instrument, incremental rotary encoders are provided in the instrument input unit and their signals are transmitted to a monitoring/control unit for further processing. The instrument also includes a carriage, which can be moved by the user in a manner that corresponds to the actuation of the resection loop. The movement of the carriage is transmitted by an axis to a linear potentiometer so that the position of the carriage can be picked up by a change in resistance.

In an article by Samur et al. (http://infoscience.epfl.ch/record/120548/files/Samur_HapticInterface_colonos copy_Haptics08.pdf), an apparatus is described for detecting movement and force recoupling in a colonoscopic simulation. Here, a colonoscope is introduced into an apparatus inside which rollers are friction-locked to the shaft of the colonoscope and convey a force reaction to the colonoscope. The movement of the rollers is measured by optical encoders to determine the linear and rotary movement of the shaft. Detecting the movement by means of rollers friction-locked to the shaft involves considerable technical complexity and inexactitude because of the necessary exact friction locking.

In WO 02/070980 A1, a simulation system for image-controlled medical methods is described in which a medical instrument, for example a catheter or endoscope, is introduced into an input unit inside which position encoders or sensors can be installed to follow the instrument's movements effected by the user. Possible sensors here include in particular two or four incremental position encoders or one or more optical sensors.

Manipulations of the internal body tissue are required as a rule in endoscopic procedures. Accordingly, flexible endoscopes usually comprise at least one working channel that runs inside the shaft that is insertable into a cavity and through which the one or more endoscopic working instruments can be introduced into the cavity. Such an endoscopic working instrument comprises an elongated shaft, which is provided for insertion into the working channel. In addition an endoscopic working instrument can comprise a tool that is positioned on the distal end of the shaft and configured to execute the desired manipulation. To actuate the tool, an actuation element can be provided on the proximal end of the shaft; by means of said element a user can control the movement of the working instrument and the tissue manipulation.

In an endoscopic simulation system it is therefore advantageous to be able also to provide training in actuating an endoscopic working instrument. For this purpose it is necessary to be able to record the movement of the working instrument, especially of the shaft, inside the working channel of the endoscope. The aforementioned arrangements, however, are not suited for detecting the movement of a flexible endoscopic working instrument inside a flexible endoscope.

In patent US 2005/0196739 A1 an endoscopic simulation system is disclosed that includes a training endoscope specially adapted for the simulation, as well as a detector that records the movements, controlled by the user, of the distal end of a flexible shaft of the training endoscope, an image-recording device that plots the shape of a patient's internal body cavity, and an image processor that generates a virtual three-dimensional image of the hollow organ from the acquired data. The training endoscope comprises an input through which an endoscopic working instrument can be introduced into the shaft of the training endoscope. In addition an element is provided to detect the movement of the inserted endoscopic working instrument. Said element comprises a calibrating or normalizing function. It thereby becomes possible to determine a starting point for introducing the endoscopic working instrument into the motion detection element that corresponds to a predetermined position inside the patient's body or inside the virtual organ. The functioning of the element to detect the movement of the working instrument is not described. There is no provision for detecting a rotary movement of the working element.

SUMMARY OF THE INVENTION

It is an object of the present invention to provide a simulation system for training in endoscopic operations, a flexible endoscope and an endoscopic working instrument for use in such a simulation system, as well as a method for recording a movement of an endoscopic working instrument and a method for training in endoscopic operations, while making possible a simple and secure detection of the movement of a working element that is to be inserted through a working channel of the flexible endoscope.

This object is fulfilled by means of a simulation system for training in endoscopic operations, including an endoscope apparatus, which comprises at least one input for inserting an endoscopic working instrument, at least one sensor arrangement to detect a movement of the at least one endoscopic working instrument, a control device to generate a virtual image of an endoscopic operation scene depending on a movement of the at least one endoscopic working instrument, transmission means to transmit measured values supplied by the sensor arrangement to the control device for use in generating the virtual image and a display device to display the virtual image, wherein the sensor arrangement includes at least one optic sensor that interacts with a surface of a shaft of the endoscopic working instrument to detect the movement of the endoscopic working instrument. This object is also fulfilled by means of a flexible endoscope including an elongated shaft for insertion into a cavity, where the shaft comprises at least one working channel to introduce an endoscopic working instrument into the cavity, and an endoscope head that comprises at least one input to introduce the endoscopic working instrument into the shaft, wherein at least one sensor arrangement to detect a movement of the at least one endoscopic working instrument is present, which includes at least one optic sensor that interacts with a surface of a shaft of the endoscopic working instrument to detect the movement of the endoscopic working instrument. This object is also fulfilled by means of an endoscopic working instrument with an elongated shaft, wherein a surface of the shaft comprises at least one reference mark for the detection of a starting point of the translational movement and/or at least one reference mark for the detection of a starting point for the rotary movement of the endoscopically usable instrument. Finally, this object is also fulfilled by means of a method for recording a movement of an endoscopic working instrument comprising the steps of providing a flexible endoscope, which comprises at least one working channel, inserting an endoscopically insertable working instrument in an input of the working channel, illuminating a surface of a shaft of the endoscopically insertable working element, recording a reflected radiation from the surface of the shaft, and ascertaining a motion indicator from the recorded radiation. The method may include the additional steps of transmitting the measured values of the motion indicator to a control device, generating a virtual image of an endoscopic operation scene by means of the control device, depending on the movement of the endoscopic working instrument recorded by the measured values, and displaying the virtual image for a user.

An inventive simulation system includes an endoscope apparatus that corresponds in preferred manner to a proximal part of a clinically usable endoscope or is copied therefrom. In particular, the endoscope apparatus can comprise an endoscope head that includes a hand grip as well as a shaft that is suited for insertion into an internal body cavity or is at least partly copied from such a shaft. Operational elements can be provided on the endoscope head to operate the endoscope as well as supply lines such as for insufflation, flushing, siphoning and/or illumination or corresponding connections. The endoscope head can, in addition, include a connection for coupling a video camera or lines or connections for transmitting an image, such as one taken on the distal end of the shaft by a video camera integrated in the endoscope, to an evaluation and/or playback unit. Additional operational elements, such as for controlling the movement of the distal end of the endoscope shaft, can also be present. The endoscope apparatus also comprises at least one input for inserting an endoscopic working instrument. The input can, for example, be positioned on the endoscope head, in preferred manner in the area of the distal end of the endoscope head in the vicinity of the transition of the endoscope head into the shaft. Several inputs are preferably provided, which for example can be positioned opposite one another with reference to a shaft axis.

An endoscopic working instrument that is to be introduced into the input comprises in particular an elongated flexible shaft, which is suited for insertion into the working channel of a flexible endoscope. A tool can be positioned on the distal end of the shaft of the working element, for example a forceps, scissors, or coagulation loop, which can be controllable by an operational element positioned on the proximal end of the working instrument, for example with the help of a hand grip.

To introduce the working instrument into the shaft, a movement occurs, in particular in the axial direction, that is, in the direction of the shaft of the working instrument. An axial movement is likewise required for further introducing the working instrument into the endoscope apparatus. The corresponding translational movement can be controlled by a user from the proximal end of the working instrument. For detecting the movement of the endoscopic working instrument, a sensor apparatus is provided, which generates value measurements concerning the movement of the working element, which are transmitted to a control device.

The control device is configured in such a way that the measured values of the movement of the endoscopic working element are evaluated in generating a virtual image, which in particular depicts an endoscopic view of an internal body cavity into which the distal end of an endoscope has been introduced. The control device includes in particular at least one processor for executing the computation operations required for this purpose, and a number of additional data and parameters can be used. Thus, for example, a storage device can be present for storing data about the internal body cavity in which a surgical procedure is to take place for which training with the simulation system shall occur. These data can be totally or partly patient-specific and can also include data on the access route, so that the insertion of the distal part of an endoscope into the internal body cavity can also be simulated. It is also possible to process other parameters, which for instance can represent the degree of insertion of the endoscope shaft into the cavity, the curvature of the shaft, the bending of the distal end that is controllable by the user, the actuation of other operational elements such as for flushing, siphoning, insufflation or for illumination. Methods for generating a virtual image of this type are known per se, under the term "virtual reality," as are computer systems for executing such methods; for this purpose reference is made in particular to the aforementioned DE 10 2004 046 038 A1.

The image generated by the control device and designated here as "virtual image" depicts the scene that would be recorded on executing the corresponding endoscopic procedure with the help of optical systems found in the endoscope and of a video camera linked to the endoscope and would be displayed for a user, in particular the physician executing the surgical procedure. For this purpose the simulation system includes a display device for displaying the virtual image generated by the control device, for example a video screen, a video projector or a head-mounted display (mounted on the user's head). The virtual image is preferably generated by the control device in real time and projected on the display unit to make possible an immediate reaction of the manipulations carried out by the user and thereby a realistic simulation.

The recorded movement of the endoscopic working instrument can be evaluated, for example, in such a way that the tool linked to the working instrument and positioned on the distal end of the shaft is displayed, possibly together with a part of the shaft of the working instrument that is visible in the endoscopic image, as well as the movements of the tool and shaft. Here additional influences can be taken into account in calculating the endoscopic image, such as the changed appearance of the tool in flushing liquid, which can be clouded by bleeding, or like the movement of the endoscope tip, which the user can control by corresponding control elements, or the user's selected orientation of the endoscope head relative to a longitudinal axis of the endoscope. When several tools are present on a working instrument, these several tools can be depicted, and the same applies, when several working instruments are inserted, concerning the tools and possible visible shaft portions that are linked to said instruments.

To detect the movement of the endoscopic working instrument, according to the invention a sensor arrangement is provided that includes at least one optic sensor, which acts together with the surface of the shaft of the working instrument to detect the movement of the endoscopic working element. In particular, by means of a light source that makes possible both the emission of electromagnetic radiation in the visible and/or invisible wavelength range, an area of the surface of the shaft of the working instrument is illuminated and the radiation reflected by the surface is recorded by a sensor, so that changes in radiation caused by the movement can be detected. This can occur, for example, on the basis of the sensed change in surface brightness by a single optic sensor. As a result the movement of the shaft of the working instrument is detected directly, without the intermediary of mechanical means. In particular, contact-less tracking of the shaft surface becomes possible. Consequently a simple and secure detection of the movement of the inserted working instrument and thus a realistic simulation of the surgical situation can occur. In particular, it becomes possible to avoid the faulty detections that are known to occur with sensors in which mechanical elements are powered by a friction locking and their movement is detected. In addition, simple and reasonably priced optic sensors are available that in addition make a compact structure possible.

In particular, as a result, in simple manner free of malfunctions, the movement of the inserted working instrument with respect to the endoscope can be detected. The corresponding movement data can therefore be processed directly by the control unit in order to depict in the generated virtual image the tool of the working instrument in relation to the tip of the endoscope, where as a rule the endoscopic image is recorded.

The detection of the movements of several working instruments can be foreseen in a simulation system according to the invention. The simulation system can also include further components, for example pumps, a light source or an input unit for recording the movement of the endoscope apparatus, which serves to simulate the movement of an endoscope in a body cavity. The input unit can be constructed in known manner or can include an optic sensor that works together with the surface of a shaft of the endoscope apparatus to detect the movement of the endoscope apparatus.

In a preferred elaboration of the invention, an actuation of an actuation element positioned on the proximal end of the working instrument is recorded by an additional sensor. As a result it is possible to display a corresponding action of the tool, such as opening or closing a tool configured as a scissors or forceps, or the generation of gas bubbles in a flushing liquid on the actuation of a high frequency surgical tool. This is made possible by a particularly realistic simulation.

To bring the tool into the appropriate position for use, for example to execute an incision in a particular direction in a particular tissue area, a rotation of the working instrument around its longitudinal axis, in particular the axis of the shaft of the working instrument, is required in addition to a sliding in the longitudinal direction. The corresponding translational and rotary movements of the working instrument can be controlled by the user from the proximal end of the working instrument, in particular by means of a corresponding translational movement or rotation of the actuation element.

According to a preferred embodiment of the invention, the at least one optic sensor is configured for detecting translational and rotary movements of the shaft of the working instrument. Because the endoscopic working instrument inside a working channel of a flexible endoscope comprises only two degrees of freedom, the movement of the working instrument inside the endoscope shaft can be completely described by the detection of the translational and rotary movement. In using several working instruments or working instruments with several tools, it is preferable to record the translational and rotary movements of all working instruments or tools. The detected translational and/or rotary movements can be correspondingly evaluated by the control device during generation of the virtual image, in order to display translational or rotary movements of the tool or tools. As a result an especially realistic simulation becomes possible.

Optical imaging sensors are particularly suited for recording movements in two degrees of freedom. Sensors of this type are known in themselves and work in particular on the principle of correlation or optic flow. For this purpose images of an observed surface are taken in time sequence and each is evaluated in comparison to one or more previous images. The movement can be detected through a modification of the succeeding images, in particular from a correlation of the images or through the optic flow ascertained from a comparison of the brightness gradients. In addition, the size of the movement, that is, the speed of the shaft of the working instrument relative to the sensor arrangement, can be measured along with the time intervals of the images. Here the axial component can be consulted directly to determine the linear, translational movement of the shaft of the working instrument, while the component perpendicular to it, the movement of the shaft surface, can be converted into a rotary movement with the help of a known diameter of the shaft of the working instrument. Finally, the traversed distance or traversed angle can be measured by time integration or by summation of movement increments. As a result, all data required for the simulation can be ascertained.

In a preferred embodiment of the invention, the sensor arrangement includes at least one LED (light emitting diode) or one laser light source, in particular a laser diode. As a result, a simple and cost-effective configuration can be achieved that allows secure recording of measured values. In particular, a laser diode has the advantage that an image that can be evaluated is always obtained on a number of different surfaces.

The light source for illuminating a surface area of the shaft of the endoscopic working instrument can also be configured in such a way that a pattern is projected onto the surface. This results in heightened contrast and a secure detection.

A sensor arrangement of this type, in addition, can also include at least one image sensor, along with imaging means, such as a lens optic, to generate an image of the surface of the shaft of the endoscopic working instrument on an image recorder of the image sensor. The image sensor, in addition, can include electronic components to pre-evaluate the image recorded by the image receptor. With the help of an arrangement of this type, a simple and secure detection of the movement of the surface of the shaft of the endoscopic instrument is possible in two movement directions. Sensors of this type are available in simple, compact and cost-effective form and are used, for example, in optic computer mouses.

Known methods for evaluating the image generated in this manner include, for example, methods to determine the optic flow, from which a movement increment from one recorded image of the image sensor to the next is conveyed and the entire traversed distance can be determined by summation. As a result, both the feeder distance of the endoscopic working instrument and the traversed rotary angle can be determined.

In a preferred elaboration of the invention, on the basis of a zero point of the translational movement and considering the ascertained feeder distance, which can be positive or negative, as well as the length of the working instrument and of the working channel of an endoscope on which the simulation is based, an actual position of the working instrument is determined. Consequently it is possible to correctly display the speed and position of the tool of the working element in the generated virtual image. Likewise, in working instruments that have a preformed curvature so that the tool assumes a bent position depending on the extension out of the distal end of the working channel, said position can be correctly displayed. This results in an improved simulation.

It is further preferred, on the basis of a zero point of the rotary movement and considering the ascertained rotary angle, to determine an actual rotary position of the tool of the working instrument. This makes it possible to correctly depict the rotary speed and rotary position of the tool of the working element in the generated virtual image. This too results in improving the realism of the simulation.

According to a preferred embodiment of the invention, the sensor arrangement is configured to recognize at least one reference mark on the surface of the shaft of an inserted endoscopic working instrument. Recognition of a reference mark makes possible an automatic determination of a starting or zero point of the movement of the working instrument. On the basis of such a zero point, by calculating the traversed linear and rotary paths, it becomes possible to determine the insertion length and spatial position of a working instrument or of a tool linked to it. This makes possible the display of the position and orientation of the tool and possibly of the visible part of the shaft of the working instrument in the virtual image in the same way as would apply for an operation with a flexible endoscope and a working instrument of the same type on the basis of the measured movement, and possibly also for the reciprocal action with the tissue, for example for removal of a tissue sample by a tool configured as an excision forceps.

In this manner, in particular, the position and orientation of the tool can be determined relative to the endoscope apparatus, by using the geometric data of the working instrument and of an endoscope that is to be simulated, relative to the distal end of the shaft of the endoscope, and thus one can directly determine the position and orientation in the virtual image. Consequently a realistic simulation is achieved in an especially simple and secure manner.

According to one embodiment of the invention, the sensor arrangement is integrated into the endoscope apparatus, in particular in the area of the input for inserting the endoscopic working instrument. This makes possible a compact realization of the endoscope apparatus and thus of the simulation system.

According to another embodiment of the invention, the sensor arrangement is contained in a sensor unit that, in particular, can have a compact housing that can include a connection for a data line to transmit measured values supplied by the sensor arrangement to the control device. In addition the sensor unit can include electrical and electronic components for pre-processing the measured values of the sensor arrangement and/or for transmission to the control device, such as amplifiers, ND converters and an interface for forwarding data. Preferably, the sensor unit is separably connected with the endoscope apparatus and in particular can be coupled to it by mechanical means. This has the advantage of especially simple handling. The sensor unit can also be configured in such a way that it is compatible with a number of endoscope types. This has the further advantage that a single sensor unit can be used within a simulation system suited for different endoscopes.

In particular, the sensor unit can include a housing that comprises a continuous channel for insertion of the shaft of an endoscopic working instrument, so that at least one optic sensor is positioned on the channel and interacts with the surface of the shaft of the working instrument to record the movement of the shaft. In addition, coupling devices can be provided on the housing to connect the distal end of the channel with the proximal end of a working channel of the flexible endoscope. In this manner the sensor unit can be coupled on the input of the endoscope apparatus. In particular, for example, the sensor unit can be introduced into a covering lid or insulating lid present on the proximal end of the working channel of the endoscope, or can be introduced in place of said lid. This has the advantage that no modification is necessary for customary, clinically usable endoscopes.

In a preferred elaboration, a covering or insulating lid can be affixed on the proximal end of the channel of the sensor unit. The advantage is that this can ensure proper insulation of the working channel even with the sensor unit affixed to the endoscope. As a result, use of the sensor unit is immediately possible when, for example, a siphoning channel feeds into the working channel.

According to another preferred embodiment, the endoscope apparatus is configured as a flexible endoscope with an endoscope head and a flexible, elongated shaft, so that the shaft comprises at least one working channel for insertion of an endoscopic working instrument, and into said channel a working instrument can be inserted via an input positioned on the endoscope head. This configuration makes possible an especially realistic duplication of a clinically usable endoscope. Similarly, in this manner the friction that needs to be overcome in moving the working instrument is depicted with realistic effect.

According to another embodiment, the endoscope apparatus is a clinically usable endoscope. This can include the sensor arrangement as well as transmission means to transmit recorded data on the movement of the working instrument. The clinically usable endoscope can also be separably connected with a sensor unit, so that the sensor arrangement, when used outside the simulation system, can be uncoupled. This has the advantage that an endoscope can be used within the simulation system although it has not been modified for this purpose or if so, only to a limited extent, and is suited for clinical applications. As a result, especially realistic training conditions are possible.

According to another embodiment, the endoscope apparatus is an endoscope that has been modified for use in an endoscopic simulation system and is based at least partly on an endoscope suited for clinical applications. Contrary to an original endoscope, that is, an endoscope suited for clinical applications, such a training endoscope can be modified, for example, in such a manner that the shaft is not foreseen for insertion into an internal body cavity or that not all listed functions and connections have been realized. For a realistic simulation the endoscope head of the training endoscope should correspond as closely as possible to that of the original endoscope in terms of size, shape and weight. A training endoscope is not required to meet the same security requirements as a clinically usable endoscope and is therefore available at lower cost.

An inventive flexible endoscope includes an elongated shaft for insertion into a cavity that comprises at least one working channel for inserting an endoscopic working instrument, and an endoscope head that comprises at least one input for introducing the endoscopic working instrument into the shaft or into the working channel. In addition the endoscope comprises at least one sensor arrangement that serves to detect a movement of the at least one endoscopic working instrument and that includes at least one optic sensor, which interacts with a surface of a shaft of the endoscopic working instrument to detect the movement of the endoscopic working instrument. Moreover, the endoscope can include transmission means for transmitting the measured values supplied by the sensor arrangement to a control device. A flexible endoscope of this type is suited for use in an inventive simulation system in which the control device generates a virtual image of an endoscopic operation scene depending on a movement of the at least one endoscopic working instrument. An endoscope of this type can also be used in other situations where the recording of the movement of the working instrument is advantageous, for example for documentation purposes or for monitoring telemedical applications.

In an inventive simulation system or together with an inventive flexible endoscope, a working instrument can be used that is configured in the customary manner with an elongated flexible shaft, a working element or tool on its distal end, and an actuation element positioned on the proximal end of the shaft.

In especially advantageous manner, for use in an inventive simulation system or with an inventive flexible endoscope, an inventive endoscopically usable working instrument is foreseen that includes an elongated flexible shaft on whose distal end a working element is positioned. Preferably this instrument can be operated by means of an actuation element positioned on the proximal end, for which purpose transmission means, such as a traction wire or electric lines, can be positioned inside the shaft. In preferred manner an inventive working instrument comprises at least one reference mark, which is positioned on the surface of the shaft of the working instrument. The reference mark is configured in such a way that it can be detected by a sensor arrangement of the simulation system or of the endoscope. As a result, recognition of a zero or starting point in introducing the working element into the shaft is ensured, so that from this point, on the basis of the additional movement of the working element detected by a sensor arrangement of the simulation system or of the endoscope, an actual position can be ascertained, especially relative to the endoscope, and can be used for example to generate a virtual image.

In particular, separate reference marks can be foreseen for the translational and/or rotary movements. Structures extending in the peripheral direction on the shaft are especially suited as reference marks for translational movement, while the most appropriate reference marks for recognizing rotary movement are structures extending in the axial direction on the shaft. As a result, it becomes possible to recognize the reference marks for translational movement when the shaft is at any possible rotated position, and reference marks for rotary movement are clear at any advancing position at all. The reference marks for the translational movement can also use a structure that differs from that of the reference marks for rotary movement, for example with a different width, a different material, or a different surface structure.

In advantageous manner, several reference marks can be provided for the translational and/or rotary movement of the shaft in order to ensure a secure recognition and/or measurement of the particular linear or rotary position. It is especially advantageous if these marks are each of different configurations, so that recognition of the particular linear or rotary position is possible even at different positions. The particular linear or rotary position of the shaft can thus be coded in various ways, for example by different grades of brightness or contrasts, by various widths or else through different distances between successive reference marks. As a result, at any moment, even, for example, after a breakdown of the system during insertion of the endoscopic working instrument, the actual position can be securely determined again, and the working instrument needs only to be moved in linear or rotary manner for a relatively short distance.

According to a preferred elaboration, the at least one reference mark comprises a brightness and/or roughness contrast to the surface of the shaft of the working instrument. As a result, a secure recognition of the reference mark is possible on the basis of the signal of the sensor. In particular, recognition of the reference mark is possible with the help of the same sensor, which is provided for the detection of the shaft movement.

According to another preferred embodiment, the reference marks are configured by reflecting, absorbing and/or fluorescent surface areas. Surface areas that reflect or absorb differently from the neighboring shaft surface make possible a simple and secure recognition of the particular reference marks. Which configuration of the reference marks is advantageous depends in particular on the type of shaft surface and on the type and arrangement of the light source and sensor. A reference mark configured as highly reflecting has the particular advantage of being always securely recognizable, independently of the wavelength employed. A surface of the reference mark that differs in fluorescence from the other surface, especially by being of stronger or weaker fluorescence, makes possible in particular a detection of the reference mark by a signal in a modified wavelength area. Thus, for example there can be illumination in a shorter wavelength and in this area the movement can be detected or measured, while the reference mark generates a signal at a longer wavelength or vice versa. As a result, an especially breakdown-resistant detection of the reference mark is possible.

Recognition of a reference mark can, for example, occur when the surface is configured in such a way that no detection of movement is possible over a short sliding distance or a small angle range, such as because of too small or too great a brightness of the signal detected by the sensor or because of insufficient surface structures. As a result it can occur that the signal of the sensor that is used for motion detection makes recognition of the reference mark possible.

In addition it is preferable that the surface of the shaft of the endoscopic working instrument should be processed in such a way that the surface has a structure that is optimal for tracking the movement. In particular it is preferable that the shaft of the endoscopic working instrument is of matte finish at least in part. In particular in the area that is used for tracking, that is, on which the optic sensor acts during the movement, a matte surface can be provided. To generate a matte surface, it can be roughened for example, preferably with a rawness Rz of more than ca. 2 micrometers, or provided with a corresponding coating. A matte surface allows, along with high resolution, the recognition of modifications of the observed structure, which occur during movements, and therefore detection of an optic signal reflected by the surface, said signal being largely independent of the direction of the radiation and the observation and also, for example, independent of the curvature of the surface. As a result a particularly precise and secure detection or measurement of the movement of the working instrument becomes possible.

An inventive method to detect the movement of an endoscopic working instrument in a working channel of a flexible endoscope includes the following steps:

provide a flexible endoscope, which comprises at least one working channel, insert an endoscopically insertable working instrument through an input of the working channel, illuminate a surface of a shaft of the endoscopically insertable working element, record a reflected radiation from the surface of the shaft, ascertain a motion indicator from the recorded radiation.

A motion indicator can, for example, be the optic flow that can be ascertained from a series of images of the surface of the shaft of the working instrument. The speed can be determined in one or two dimensions from the optic flow and thus, as well, the translational and/or rotary movement of the working instrument.

The inventive method can include additional steps, such as the transmission of recorded data, for example of the ascertained speed indicator, to an evaluation and/or display device, the computation of the linear and/or rotary speed of the movement of the working element or the determination of a translational and/or rotary position of the working element and/or of a tool of the working element, possibly while using the recognition of one or more reference marks on the surface of the shaft of the working instrument.

An inventive method for training in endoscopic operations is based on the method described above to detect the movement of an endoscopic working instrument in a working channel of a flexible endoscope and includes, in particular, the following additional steps:

transmit the measured values of the motion indicator to a control device, generate a virtual image of an endoscopic operation scene by the control device, depending on the movement of the endoscopic working instrument recorded by the measured values, and display the virtual image for a user.

The inventive method for training in endoscopic operations can include further steps, for example the recording of the actuation of operational elements of the working instrument and the use of relevant data in generating a virtual image, which can be depicted for the user. Likewise, for example, warning signals can be generated in case of erroneous service, for example in exceeding or falling short of a forward distance that is suited or physiologically tolerable in the simulated operational situation or of a permissible angle and/or corresponding force reactions, and displayed by tactile, visual and/or acoustical means for the user.

In the foregoing comments the term "operations" or "procedures" also includes, for instance, diagnostic applications or interventions. Inventive apparatuses and methods are, just as for surgical or medical purposes, also foreseen for example to investigate and process cavities with technical objects. The inventive apparatuses and methods are also suited for demonstration and teaching purposes.

It is understood that the aforementioned properties and those still to be expounded can be used not only in the particular indicated combination but also in other combinations or alone, without departing from the context of the present invention.

Further aspects of the invention can be seen from the following description of a preferred embodiment and from the appended drawings.

BRIEF DESCRIPTION OF THE DRAWINGS

FIG. 2 is

DETAILED DESCRIPTION OF THE INVENTION

Figure 1:
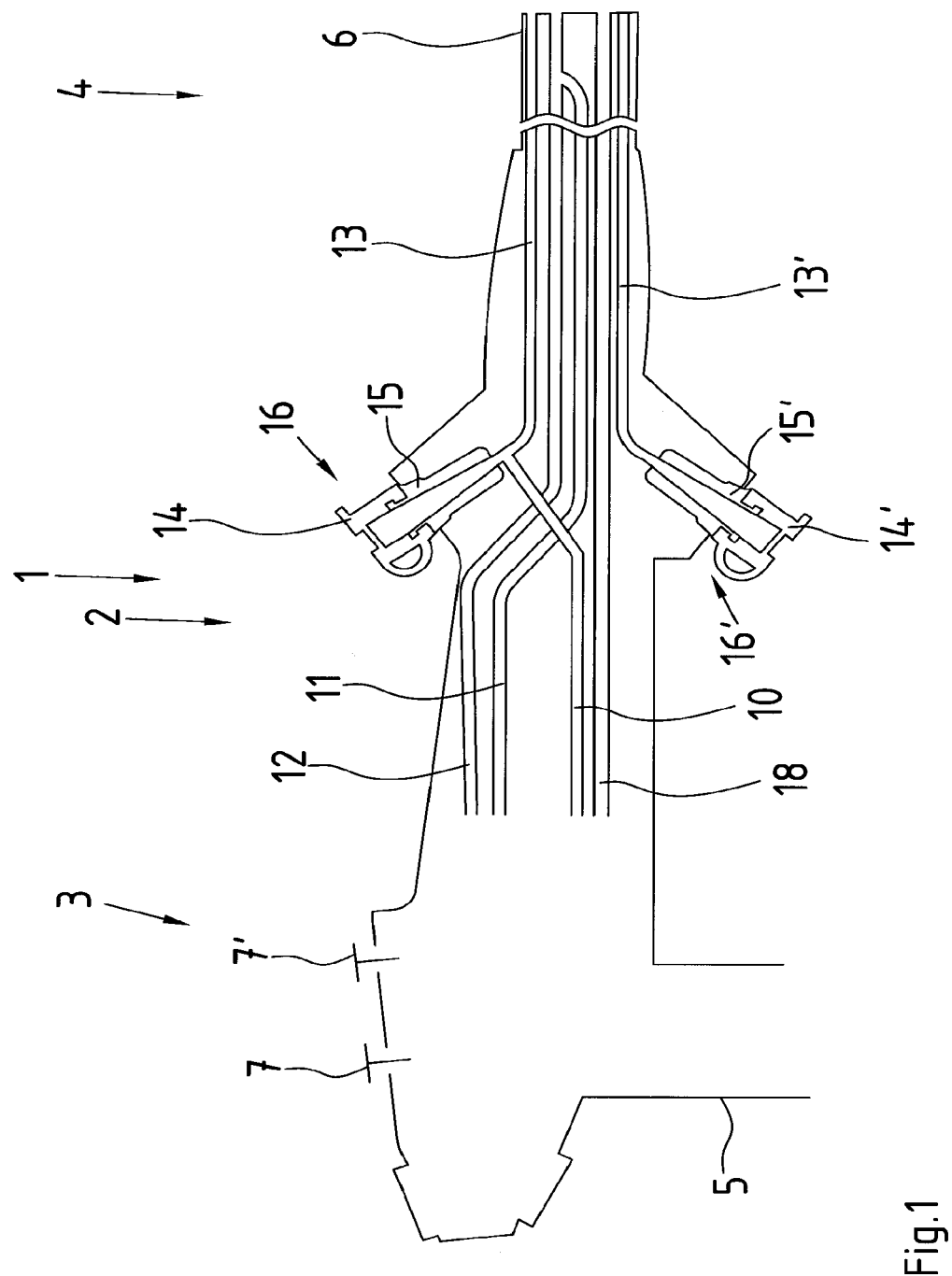
FIG. 1 shows an inventive endoscope in schematic sectional view.

An inventive endoscope 1 or an endoscope apparatus for use in an inventive simulation system is, according to the embodiment illustrated in FIG. 1, configured with an endoscope head 2, which in particular includes a hand grip 3, with an elongated flexible shaft 4 foreseen for insertion into a body cavity and with a supply hose 5 and can in addition comprise a siphoning line 10, an insufflation line 11 and a flushing line 12, which are fed through the shaft 4 all the way to its distal end 6. In the proximal area, the siphoning line 10, the insufflation line 11 and the flushing line 12 are connected (not illustrated) by the supply hose 5 with corresponding supply and control devices. The hand grip 3, in addition, can comprise valve pushbuttons 7, 7' as well as further operational elements (not illustrated).

The endoscope 1 further comprises an instrument channel or working channel 13, which is fed through the shaft 4 all the way to the distal end 6. The working channel 13 is foreseen for the insertion of working instruments and can be closed off and insulated with a cover lid 14. The working channel 13 comprises an input 16, through which an endoscopic working instrument can be introduced. To facilitate the introduction, an input socket 15 is, in particular, of conic configuration. The siphoning line 10 can flow into the working channel 13. The endoscope 1 can in addition comprise another working channel 13', which can be closed off by a locking lid 14' and comprises an input 16' with an input socket 15'.

In addition another line 18 can be present which is fed all the way to the distal end 6, as well as in some cases other components, not illustrated in FIG. 1, of a clinically usable endoscope, for example additional operational and transmission elements to control the movement or curvature of the distal end area of the shaft, an illumination lens, an observation lens, and/or a video camera with related operational elements.

Figure 2A:
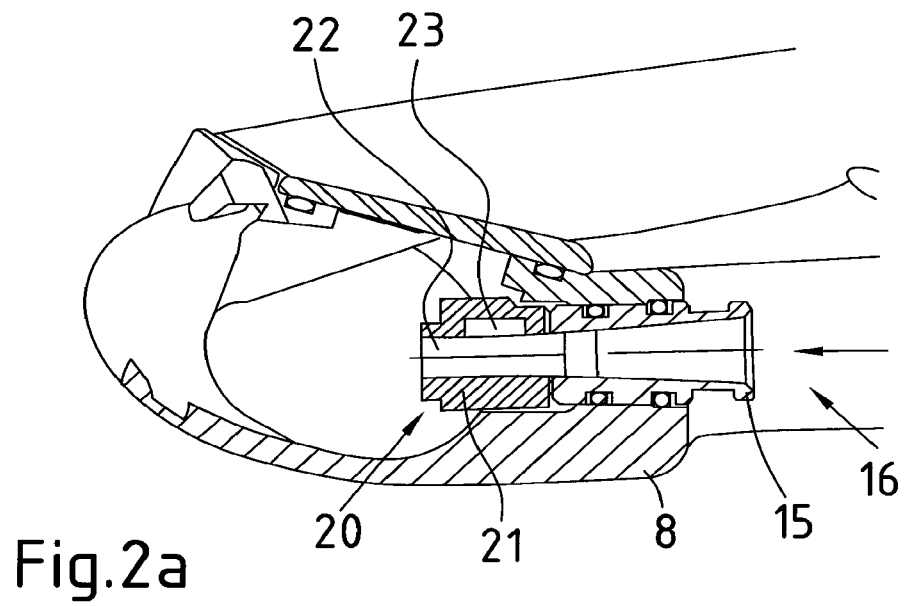
FIG. 2a shows a partial section of an embodiment of an inventive endoscope.

As is shown in a partial section in FIG. 2a, inside the endoscope head 3 at the input 16, a sensor unit 20 can be provided, which includes in particular a housing 21, which configures a channel 22 for inserting a shaft of an endoscopic working instrument that is to be inserted in the direction of the arrow. Positioned at the channel 22 is a sensor arrangement 23, which includes for example an LED to illuminate the surface of an inserted working instrument as well as an imaging lens and an image sensor for recording an image of the illuminated surface (not shown). As shown in FIG. 2a, the sensor unit 20 in this embodiment is located inside the housing 8 of the endoscope head 2.

Figure 2B:
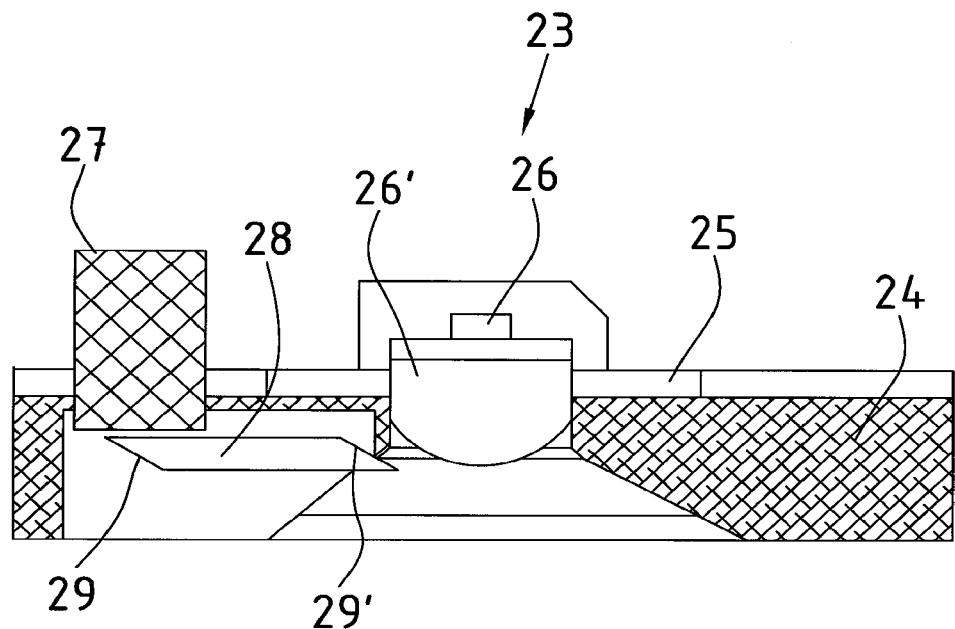
FIGS. 2b and 2c show two embodiments of a sensor arrangement in schematic sectional view.
Figure 2C:
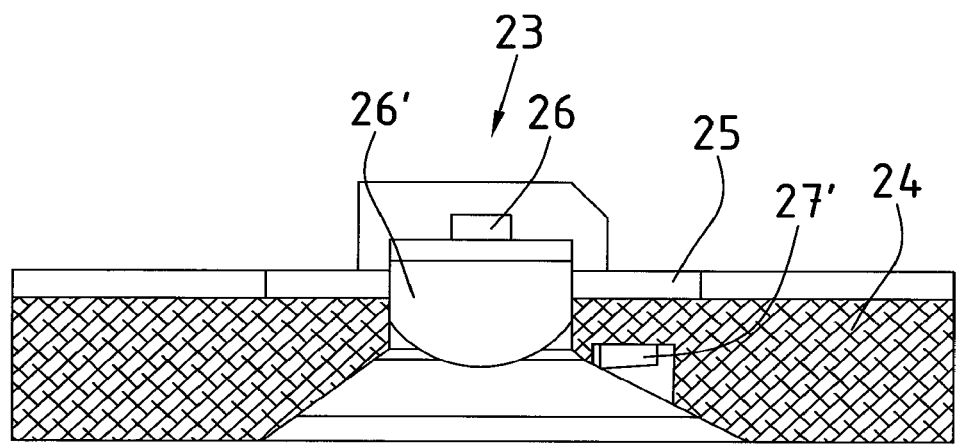

According to the embodiments illustrated in FIGS. 2b and 2c, the sensor arrangement 23 can include a carrier 24, which supports a conductor card or circuit board 25 with an optical sensor 26, which for example can be configured as an image sensor. In addition the carrier 24 supports a light source 27, 27' whose light serves to illuminate a surface of a working instrument introduced into the channel 22, in particular of the shaft of the working instrument (not shown in FIGS. 2 and 2c). An optical system 26' of the optic sensor 26 is positioned in such a way that it combines light from the surface of the working instrument that is to be detected onto the sensor 26, and in particular generates an image of the surface on the image receptor of an image sensor. The circuit board 25 can also bear the optical system 26' and/or the light source 27, 27' as well as in some cases other optical or electronic elements, which for example can serve to transmit light, power the sensor 26 and/or serve for data processing or data transmission.

As shown in FIG. 2b, the light from the light source 27 can be conducted via a light conductor 28 in the direction toward the surface of the working instrument. The light conductor 28 is a glass rod with tilted, preferably reflecting end surfaces 29, 29', but could no doubt also be configured from a bundle of light conductor fibers. The light input and/or light outlet surfaces of the light conductor can be treated with an ant reflex layering to increase the degree of effectiveness of the illumination. As light source 27 a laser diode or a light emitting diode (LED) in particular can be used. Another possibility is illumination by an external light source via a light conducting cable whose end surface can be positioned to couple the illumination lamp into the light conductor 28 or else directly to illuminate the surface of the working instrument (not shown).

According to FIG. 2c the light source 27' can be positioned also for direct illumination of the surface. For this purpose the light source 27' can be configured for example as an LED. It can be aligned parallel to a longitudinal axis of the optical system 26' of the sensor 26 because of the great angle of aperture of the illuminated light, especially if the LED includes no integrated lens and therefore acts almost as a Lambert emitter. The light source 27' can also be positioned as perpendicular to this (not shown in FIG. 2c).

As least a part of the light that strikes the shaft surface of the working instrument is reflected in the direction toward the optical system 26' of the sensor 26. Here the reflected intensity depends strongly on the type of surface, in particular on the surface structure, on any surface coating present and/or on the color of the surface. While a smooth surface primarily reflects aligned at an angle of reflection that is equal to the angle of incidence, the reflection of a matte surface is distributed over a wider angle area. The arrangement of light source 27, 27', possibly light conductor 28 and optical system 26' of the sensor 26 is therefore selected in such a way that sufficient light reaches the sensor 26 from a shaft surface used to detect the movement of the working instrument, and in addition in some cases also more secure recognition of the reference marks is possible.

Figure 3:
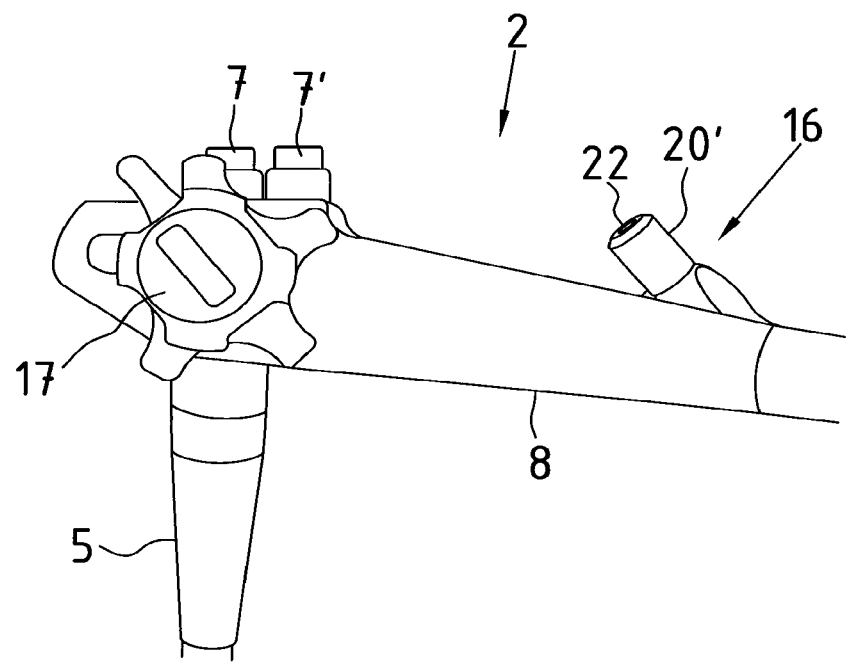
FIG. 3 shows a partial view of another embodiment of an inventive endoscope.

As shown in partial view in FIG. 3, the sensor unit 20' can also be positioned outside the housing 8 of the endoscope head 2. The channel 22 formed by the sensor unit 20' flows into the input 16 or acts itself as input for inserting an endoscopic working instrument and can therefore be configured in particular as conical in shape. Moreover, the sensor unit 20' can be configured as described with reference to FIGS. 2a through 2c. In FIG. 3 further operational elements 17 are illustrated for bending the distal end 6 of the endoscope shaft 4. A sensor unit 20 or 20' can also be present on an additional input 16'.

Figure 4:
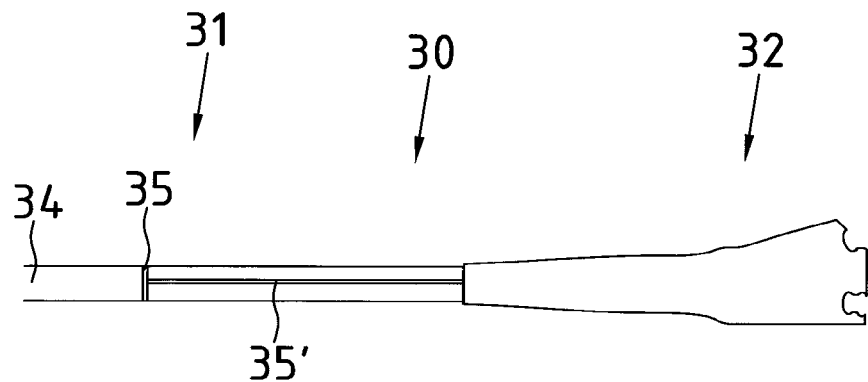
FIG. 4 shows a partial view of an embodiment of an inventive endoscope.

According to FIG. 4, an inventive working instrument 30 includes a shaft 31, a proximal end area 32 on which actuation elements and/or connections are present (not shown), as well as a tool or working element (not shown) that is positioned on the distal end of the shaft 31. The surface of the shaft 31 comprises a matted area 33 and a non-matted area 34, which constitutes a standard surface. In addition, a reference mark 35 to establish a zero point for the translational movement of the working element and a reference mark 35' to establish a zero point for the rotary movement of the working element are positioned on the surface of the shaft. The reference mark 35 here is configured as a peripherally mounted circle while the reference mark 35' is mounted as a line parallel to the axis on the surface of the shaft. The reference marks 35, 35' can for example consist of non-matted or of highly reflecting material, which generates a signal from the sensor arrangement that is clearly different from the neighboring surface areas.

Figure 5:
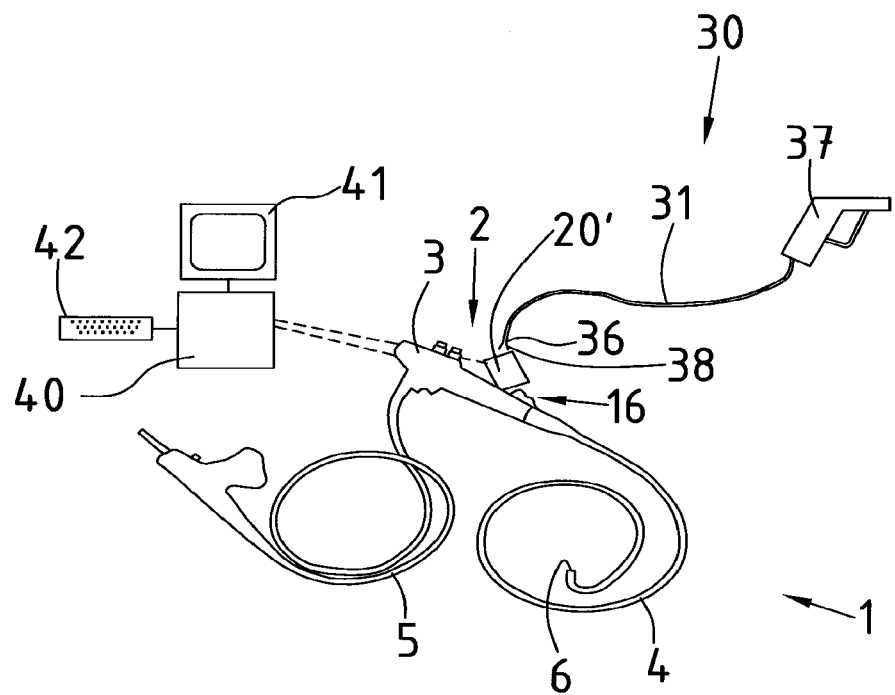
FIG. 5 shows an embodiment of an inventive simulation system in schematic view.
Figure 5:
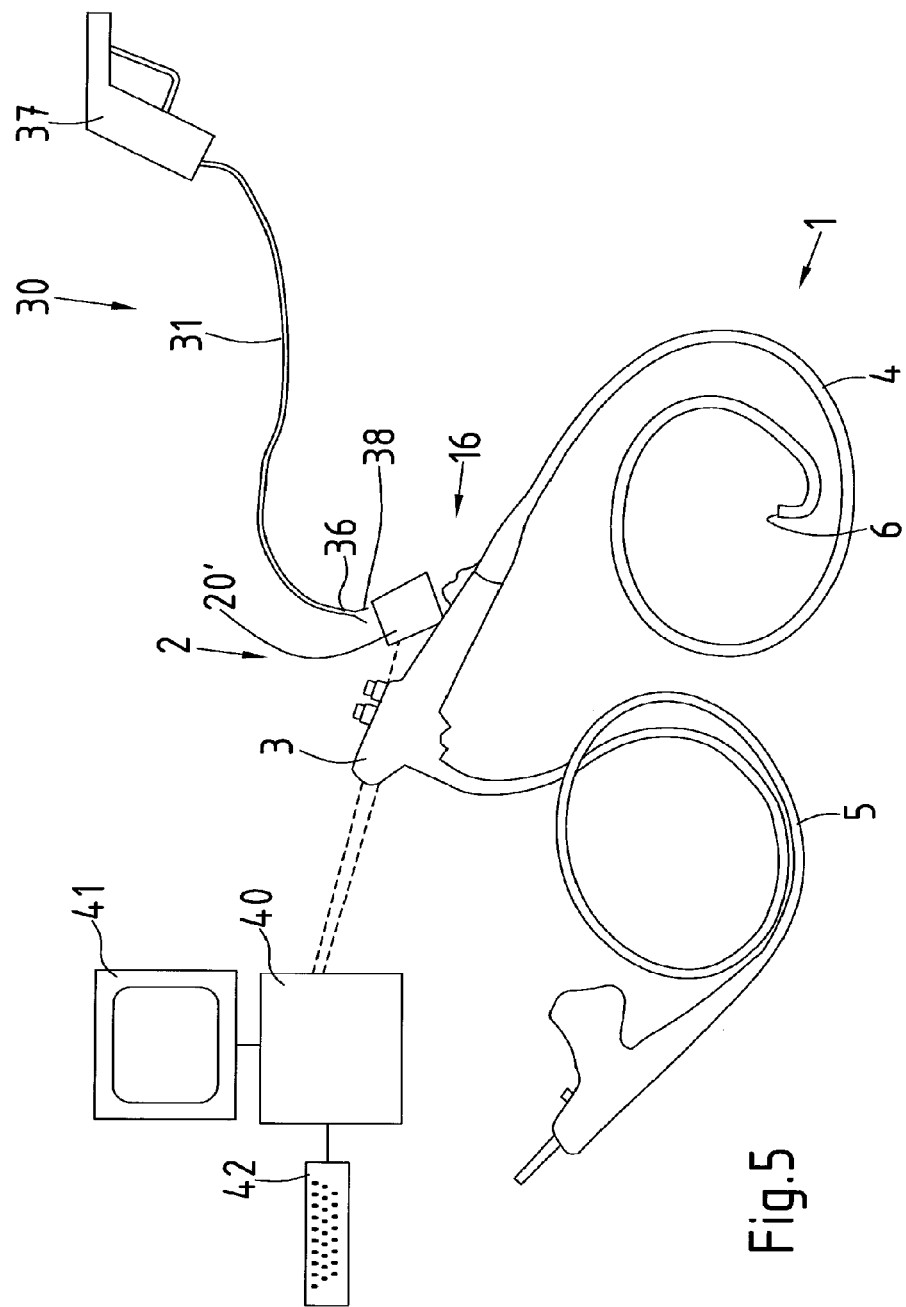

As shown in FIG. 5 in a schematic overhead depiction, an inventive simulation system includes in particular a flexible endoscope 1 with an endoscope head 2, a hand grip 3, a flexible shaft 4 and a supply hose 5. The distal end 6 of the endoscope shaft 4 can be controllable, as indicated in FIG. 5 by the stronger curvature in the end area of the shaft 4. A sensor unit 20' can be coupled on an insertion support or input 16, and through said unit a flexible endoscopic working instrument 30 can be introduced into the shaft 4 and can be inserted as far as the distal end 6 in such a way that at least one tool 38, which is positioned on the distal end 36 of the shaft 31 of the working instrument 30, extends beyond the distal end 6 of the endoscope shaft 4. A hand grip 37 to actuate the tool is positioned on the proximal end of the shaft 31 of the working instrument 30. In addition the simulation system can include an apparatus (not illustrated) to record a movement of the shaft 4 of the endoscope 1 or of the endoscope apparatus, which for example can comprise an insertion for the shaft and one or more sensors to record the movement of the shaft. The apparatus to record the movement of the shaft 4 can be constructed in a manner known in itself or else can include a sensor arrangement similar to the one foreseen according to the invention to detect the movement of the endoscopic working instrument 30.

The simulation system further includes a control device 40, which in particular includes an image processor to generate or process a video image, which is depicted on a display unit 51 for the user. The video image constitutes as virtual reality an endoscopic view of the body cavity that is subjected to an endoscopic procedure during training with the simulation system. For this purpose the control unit 40 can include in particular storage means, on which data concerning the particular body cavity are stored and can be called up for the simulation. In addition, an input device 42 can be associated with the control device 40 and can be configured for example as a keyboard or a touch screen; by means of said device the user can define, start and/or control the simulation. The control device 40 can be configured for example as a PC or else as a special image processing computer or can include such a device. In addition, additional input and/or display devices can be foreseen. The inventive simulation system can include still further components, such as a device to detect movements of the distal end 6 or of the shaft 4, which are taken into account in generating the virtual image. The measured values for the movement of the endoscopic working instrument 30, which are conveyed by the sensor unit 20', as well as other data in some cases, are transmitted from the endoscope 1 by wireless or line-linked transmission means to the control device 40 (indicated symbolically in FIG. 5 by broken lines). To transmit the measured values of the movement of the working instrument 30, a standard interface, such as a USB interface or else an interface for a computer mouse, can be used for example. The corresponding signal pre-processing can already be carried out by electronic elements within the sensor unit 20' or within the endoscope 1 or the endoscope apparatus. Likewise, a further signal processing, for example the computation of the insertion length of the endoscopic instrument, can already occur within the sensor unit 20' or within the endoscope 1. Data on the movement of the shaft 4 of the endoscope 1 or of the endoscope apparatus can also be transmitted to the control device 40.

In executing instruction or training for an endoscopic operation, the user holds the endoscope 1 or endoscope apparatus by the hand grip 3. To simulate the insertion of the endoscope into an internal body cavity, the shaft 4 of the endoscope 1 or of the endoscope apparatus is pushed in the axial direction. Thereafter, or else simultaneously or beforehand, the shaft end 36 of the endoscopic working instrument 30 is introduced into the input 16 or into the sensor unit 20 or 20' and the shaft 31 of the working instrument 30 is introduced into a working channel within the shaft 4 of the endoscope. If now a reference mark for the translational movement is detected by the sensor arrangement, then a signal is generated for the evaluation and computation of the virtual endoscopic image that is used as a zero point for the advancing movement of the working instrument 30. Additional movement is measured by the sensor arrangement by interaction with the matted surface. On the basis of the detected zero point, the advanced distance can thereby be ascertained and one can determine how far the tool 38 extends beyond the end 6 of the endoscope shaft 4 into the cavity on the basis of the indicated lengths of endoscope shaft 4 and shaft 31 of the endoscopic working instrument 30. In the same way, the sensor arrangement in detecting the reference mark for the rotary movement can generate a signal from which a predetermined rotary position is ascertained. The further rotary movement of the instrument 30 is detected by interaction of the sensor arrangement with the matte surface and makes it possible to determine the rotary position of the shaft 31 and to use it for generating the virtual image. On the basis of the detected reference mark, the position and orientation of a tool positioned on the distal end 36 of the shaft 31 of the working instrument 30 are ascertained in real time. This position and orientation are related to the distal end 6 of the shaft 4 of the endoscope. The corresponding data are transmitted to the control device 40, where a virtual image is hereby generated in which the tool 38 is depicted at the position and with the orientation that it would have in an endoscopic procedure executed with the corresponding endoscope and the corresponding working instrument after executing the same movements. When, in addition, the position and orientation of the distal end 6 of the shaft 4 of the endoscope or endoscope apparatus are ascertained, it is possible with assistance from data on the cavity to generate a virtual image that completely reproduces the endoscopic scene that is visible in the corresponding operation situation.

Depending on the simulated procedure or assignment, it is also possible of course to select another sequence than the one described by way of example above.

What is claimed is:

1. A simulation system for training in endoscopic operations, comprising an endoscope apparatus having at least two working channels, each said working channel having an input for inserting an endoscopic working instrument into said working channel;
   at least one sensor within each said working channel to detect a movement of the at least one endoscopic working instrument within said working channel;
   a control device to generate a virtual image of an endoscopic operation scene depending on a movement of the at least one endoscopic working instrument;
   a transmission means to transmit measured values supplied by the sensor arrangement to the control device for use in generating the virtual image and a display device to display the virtual image, wherein the sensor arrangement includes at least one optic sensor that interacts with a surface of a shaft of the endoscopic working instrument to detect the movement of the endoscopic working instrument; and
   wherein the sensor arrangement is configured to recognize at least one reference mark on the surface of the shaft of the endoscopic working instrument.

2. The simulation system according to claim 1, wherein the at least one optic sensor is configured to detect translational and rotary movements of the endoscopic working instrument.

3. The simulation system according to claim 1, wherein the sensor arrangement comprises at least one LED or laser light source.

4. The simulation system according to claim 1, wherein the at least one optic sensor is configured as an image sensor, and wherein the sensor arrangement in addition includes imaging means to generate an image of a surface of the endoscopic instrument on an image receptor of the image sensor.

5. The simulation system according to claim 1, wherein the sensor arrangement is contained in a sensor unit that is separably connected with the endoscope apparatus.

6. The simulation system according to claim 1, wherein the endoscope apparatus is a flexible endoscope with an endoscope head and a flexible, elongated shaft, where the shaft comprises at least one working channel for inserting the endoscopic working instrument and the input is configured to introduce the endoscopic working instrument into the shaft.

7. The simulation system according to claim 1, wherein the endoscope apparatus is a clinically usable endoscope.

8. The simulation system according to claim 1, wherein the endoscope apparatus is a training endoscope.

9. A flexible endoscope including an elongated shaft for insertion into a cavity, where the shaft comprises at least two working channels to introduce an endoscopic working instrument into the cavity, and an endoscope head that comprises at least one input for each working channel to introduce the endoscopic working instrument into the shaft, wherein at least one sensor arrangement within each said working channel detects the movement of said endoscopic working instrument within each said working channel, said sensor arrangement including at least one optic sensor that interacts with a surface of a shaft of the endoscopic working instrument to detect the movement of the endoscopic working instrument.

10. An endoscopic working instrument for use with the flexible endoscope according to claim 9, with an elongated shaft, wherein a surface of the shaft comprises at least one reference mark for the detection of a starting point of the translational movement and/or at least one reference mark for the detection of a starting point for the rotary movement of the endoscopic working instrument.

11. The endoscopic working instrument according to claim 10, wherein the at least one reference mark is constituted by a highly reflecting, highly absorbent or fluorescent surface area of the shaft of the endoscopic working instrument.

12. The endoscopic working instrument according to claim 10, wherein the shaft of the endoscopic working instrument is matte at least in part.

13. A method for recording a movement of an endoscopic working instrument, comprising the following steps:
   provide a flexible endoscope, which comprises at least two working channels, wherein each said working channel includes at least one sensor,
   insert an endoscopically insertable working instrument in an input of one of said working channels,
   illuminate a surface of a shaft of the endoscopically insertable working element within one of said working channels, wherein the surface of the shaft comprises at least one reference mark for the detection of a starting point of the translational movement and/or at least one reference mark for the detection of a starting point for the rotary movement of the endoscopically insertable working instrument, record a reflected radiation from the surface of the shaft with the said at least one sensor, ascertain a motion indicator from the recorded radiation.

14. A method for training in endoscopic operations, including a method according to claim 13 and the following additional steps transmit the measured values of the motion indicator to a control device, generate a virtual image of an endoscopic operation scene by means of the control device, depending on the movement of the endoscopically insertable working instrument recorded by the measured values and display the virtual image for a user.

\* \* \* \* \*